US012027682B2

United States Patent
Yu et al.

(10) Patent No.: US 12,027,682 B2
(45) Date of Patent: Jul. 2, 2024

(54) METHOD FOR PREPARING REFRACTORY MATERIAL FROM WASTE BATTERY RESIDUES, AND USE OF REFRACTORY MATERIAL

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Jiangdong Chen, Foshan (CN); Yinghao Xie, Foshan (CN); Jialei Xu, Foshan (CN); Benben Wu, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 0 days.

(21) Appl. No.: 18/260,032

(22) PCT Filed: Aug. 11, 2022

(86) PCT No.: PCT/CN2022/111812
§ 371 (c)(1),
(2) Date: Jun. 29, 2023

(87) PCT Pub. No.: WO2023/087798
PCT Pub. Date: May 25, 2023

(65) Prior Publication Data
US 2024/0055682 A1    Feb. 15, 2024

(30) Foreign Application Priority Data

Nov. 17, 2021 (CN) ......................... 202111359613.0

(51) Int. Cl.
*H01M 10/54*    (2006.01)
*C04B 35/622*    (2006.01)
*C04B 35/626*    (2006.01)

(52) U.S. Cl.
CPC ....... *H01M 10/54* (2013.01); *C04B 35/62204* (2013.01); *C04B 35/62675* (2013.01);
(Continued)

(58) Field of Classification Search
CPC ............ H01M 10/54; C04B 35/62204; C04B 35/62675; C04B 2235/349;
(Continued)

(56) References Cited

U.S. PATENT DOCUMENTS

2010/0090377 A1    4/2010  Im

FOREIGN PATENT DOCUMENTS

| CN | 102810657 A | 12/2012 |
| CN | 102810657 A | 12/2012 |

(Continued)

OTHER PUBLICATIONS

English translation of CN Publication 110655385, Jan. 2020.*
(Continued)

*Primary Examiner* — Brittany L Raymond
(74) *Attorney, Agent, or Firm* — Buchalter; Jason W. Croft (57) ABSTRACT

A method for preparing a refractory material from waste battery residues. The method comprises the following steps: (1) disassembling waste batteries, then sorting same to obtain positive and negative electrode powders, leaching the positive and negative electrode powders with an acid, fil-
(Continued)

tering same to obtain a graphite slag, and then subjecting the filtrate to copper removal, followed by the addition of an alkali for a precipitation reaction, wherein the resulting precipitate is an iron-aluminum slag; (2) wrapping the graphite slag obtained in step (1) with wet clay to form an inner core material, then mixing wet clay with the iron-aluminum slag, wrapping the inner core material with same, and aging the wrapped inner core material to obtain a blank; (3) pre-sintering, calcining and cooling the blank prepared in step (2) to obtain a fired product; and (4) washing and drying the fired product to obtain the refractory material.

8 Claims, 5 Drawing Sheets (52) U.S. Cl.
CPC .. *C04B 2235/349* (2013.01); *C04B 2235/425* (2013.01); *C04B 2235/442* (2013.01); *C04B 2235/6562* (2013.01); *C04B 2235/6567* (2013.01)

(58) Field of Classification Search
CPC ........ C04B 2235/425; C04B 2235/442; C04B 2235/6562; C04B 2235/6567
See application file for complete search history.

(56) References Cited

FOREIGN PATENT DOCUMENTS

| | | | |
|---|---|---|---|
| CN | 104641490 A | | 5/2015 |
| CN | 104641490 A | | 5/2015 |
| CN | 105174255 A | | 12/2015 |
| CN | 106631053 A | | 5/2017 |
| CN | 106631053 A | | 5/2017 |
| CN | 107653378 | * | 2/2018 |
| CN | 107653378 A | | 2/2018 |
| CN | 107653378 A | | 2/2018 |
| CN | 108470951 A | | 8/2018 |
| CN | 109665812 | * | 4/2019 |
| CN | 109665812 A | | 4/2019 |
| CN | 109665812 A | | 4/2019 |
| CN | 110655385 | * | 1/2020 |
| CN | 110655385 A | | 1/2020 |
| CN | 111039281 A | | 4/2020 |
| CN | 111039281 A | | 4/2020 |
| CN | 111261967 A | | 6/2020 |
| CN | 111470494 A | | 7/2020 |
| CN | 111470494 A | | 7/2020 |
| CN | 114105655 A | | 3/2022 |
| CN | 114105655 B | | 2/2023 |
| IN | 5133DELNP2009 A | | 3/2010 |
| JP | H0982339 A | | 3/1997 |
| KR | 20110116468 A | | 10/2011 |

OTHER PUBLICATIONS

English translation of CN Publication 109665812, Apr. 2019.*
English translation of CN Publication 107653378, Feb. 2018.*
International Search Report in PCT/CN2022/111812 mailed Oct. 28, 2022.
First Office Action in Chinese Application CN2021113596130 mailed Jul. 11, 2022.
First Office Action in Chinese Patent Application 202111359613.0 mailed Jul. 11, 2022.
Notification to Grant Patent Right for Invention Notification to Grant Patent Right for Invention Dec. 5, 2022.
Written Opinion in PCT/CN2022/111812 mailed Oct. 28, 2022.

* cited by examiner

METHOD FOR PREPARING REFRACTORY MATERIAL FROM WASTE BATTERY RESIDUES, AND USE OF REFRACTORY MATERIAL

CROSS-REFERENCE TO RELATED APPLICATION

This application is a national stage filing under 35 U.S.C. § 371 of international application number PCT/CN2022/111812, filed Aug. 11, 2022, which claims priority to Chinese patent application No. 202111359613.0, filed Nov. 17, 2021. The contents of these applications are incorporated herein by reference in their entirety.

TECHNICAL FIELD

The present disclosure belongs to the technical field of waste battery recycling, and more particularly, to a method for preparing refractory materials with waste battery residues, and an application of the refractory materials.

BACKGROUND

With the increasing degree of electrification in China, batteries have been used in various fields of people's lives, so there are a large number of waste batteries. Therefore, recycling of waste batteries is of great practical significance, which is beneficial to environmental protection while recycling resources. In the existing recycling process of waste batteries, some waste residues such as iron-aluminum slags are often produced while recycling useful metals. Because the components of these waste residues are impure, the waste residues are often treated by direct landfill, which still causes secondary pollution to the environment. Therefore, the existing recycling methods of waste batteries still need to be further upgraded.

SUMMARY

The present disclosure aims at solving at least one of the technical problems in the prior art. Therefore, the present disclosure provides a method for preparing refractory materials with waste battery residues and an application of the refractory materials. By this method, the waste residues generated in the recycling process of the waste batteries can be further recycled to avoid secondary pollution to the environment.

The above-mentioned technical objects of the present disclosure are achieved by the following technical solutions.

A method for preparing refractory materials with waste battery residues includes the following steps of: (1) dismantling a waste battery and sorting to obtain positive and negative electrode powders, performing acid leaching on the positive and negative powders, filtering to obtain a graphite slag, then removing copper from a filtrate, and adding an alkali for a precipitation reaction to obtain an iron-aluminum slag; (2) wrapping the graphite slag obtained in step (1) with wet clay into an inner core material, mixing the wet clay with the iron-aluminum slag and then wrapping the inner core material, and aging to obtain a blank; (3) pre-sintering, calcining and cooling the blank prepared in step (3) to obtain a sintered product; and (4) washing and drying the sintered product to obtain the refractory materials.

Preferably, the wet clay in step (2) is prepared by mixing clay with a potassium carbonate solution.

Preferably, a mass ratio of the clay to the potassium carbonate solution in the wet clay is (55 to 79):(21 to 45).

Further preferably, the mass ratio of the clay to the potassium carbonate solution in the wet clay is 67:33.

Preferably, the potassium carbonate solution is prepared by potassium carbonate and water, where a mass ratio of the potassium carbonate to the water is (1 to 5):(20 to 40).

Further preferably, the potassium carbonate solution is prepared by potassium carbonate and water, where the mass ratio of the potassium carbonate to the water is 3:30.

Preferably, in step (2), a mass ratio of the iron-aluminum slag to the graphite slag and the wet clay is (5 to 7):(2 to 4):1.

Further preferably, in step (2), the mass ratio of the iron-aluminum slag to the graphite slag and the wet clay is 6:3:1.

Preferably, in step (2), the aging is performed at a temperature of 25° C. to 35° C., and lasts for 12 hours to 36 hours.

Further preferably, in step (2), the aging is performed at a temperature of 25° C., and lasts for 24 hours.

Preferably, in step (3), the pre-sintering is performed at a temperature of 300° C. to 500° C., and lasts for 1 hour to 3 hours.

Further preferably, in step (3), the pre-sintering is performed at a temperature of 400° C., and lasts for 1 hour.

Preferably, in step (3), the calcining is performed at a temperature of 900° C. to 1,100° C. and lasts for 1 hour to 3 hours, and a heating rate from pre-sintering to calcining is 3° C./min to 10° C./min.

Preferably, in step (3), the calcining is performed at a temperature of 1,100° C. and lasts for 1 hour, and the heating rate from pre-sintering to calcining is 5° C./min.

Preferably, the washing in step (4) is to wash the sintered product with a hydrochloric acid first and then with water.

Preferably, the drying in step (4) is performed at a temperature of 80° C. and lasts for 6 hours.

Refractory materials, where the refractory materials are prepared by the preparation method above.

An application of the refractory materials above in packaging, transportation and storage of a waste battery.

Specifically, in the process of packaging, transportation and storage of the waste battery, the refractory materials are placed between a packaging box and the waste battery.

The present disclosure has the beneficial effects that:

(1) The preparation method provided by the present disclosure is simple in operation, mild in reaction conditions, pollution-free to the environment, suitable for industrial production, and can effectively recycle the industrial waste residues generated in the battery recycling process to synthesize new refractories, thereby turning waste into wealth, avoiding secondary pollution, reducing the manufacturing cost and optimizing the recycling process.

(2) In the preparation method provided by the present disclosure, an activation ability of the potassium carbonate is utilized for the first time. When the calcining temperature is higher than 750° C., $K_2CO_3$ is decomposed into $CO_2$ and $K_2O$ ($K_2CO_3 \triangleq K_2O + CO_2 \uparrow$), and a part of $K_2O$ is reduced by carbon atoms at high temperature to generate metal potassium, which consumes carbon and increases the specific surface area; and when, when the temperature is higher than a boiling point (774° C.) of the metal potassium, the metal potassium enters the refractory materials structure in the form of potassium vapor, which increases the distance between the refractories, thus increasing the pore volume. In addition, the produced $CO_2$ is a good physical activator and porogen, which can further increase the pore volume of the refractory materials, further improve the absorption capacity of the refractory materials and further improve the safety performance of the refractory materials.

(3) Waste batteries, such as discarded lithium ion batteries, may be short-circuited due to improper packaging during packaging, transportation and storage due to high-risk factors such as flammability and explosiveness, resulting in high-risk accidents. The present disclosure first proposes to use the waste battery residues as the raw materials to prepare the refractory materials, and apply the refractory materials in the packaging, transportation and storage process of the waste batteries. The refractory materials prepared by the present disclosure can be placed between the packaging box and the waste battery, thus achieving the functions of heat insulation, shockproof, absorbing leaked electrolyte, isolating the contact between the waste battery and the air when the waste battery is burning, reducing the fire and preventing the battery from exploding. Moreover, when the waste battery catches fire in the package, the refractory materials can quickly absorb heat, isolate oxygen, weaken the fire, and finally extinguish the fire. Meanwhile, the refractory materials can protect the package from damage and gas and liquid leakage, and realize the safe packaging, transportation and storage of the waste battery. According to the present disclosure, through the high-temperature test of the refractory materials and the test of the electrolyte absorption capacity, it is proved that the refractory materials can effectively improve the safety performance of the waste battery in the recycling process.

(4) The present disclosure designs a multi-layer porous refractory, where the graphite slag in the inner layer expands after calcining to form a porous graphite structure, the middle layer is clay, and the outer layer is iron-aluminum slag and clay. With the multilayer structure, the electrolyte and heat can be respectively absorbed layer by layer. Due to pore-forming and activating abilities of the potassium carbonate, the porous refractory with inner, middle and outer layers is formed, where the iron-aluminum slag and the clay layer have strong heat resistance and absorb heat quickly, thus ensuring that the heat will not be emitted to the environment. The porous graphite layer has strong absorption capacity, and the leaked electrolyte permeates through the middle and outer layers, and is finally absorbed into the porous graphite layer for storage, thus ensuring that the electrolyte will not leak out of the refractory materials and cause dangerous accidents.

(5) The porous refractory prepared by the present disclosure has the characteristic of recycling, effectively controls the cost, shows the characteristic of environmental protection, has no metal pollution, avoids resource waste, prolongs the service life, and keeps the ability thereof unchanged after repeated use for many times, which indicates that the refractory materials has excellent stability and high commercial application value.

DETAILED DESCRIPTION

The present disclosure is further illustrated hereinafter with reference to the specific embodiments, where the room temperature and normal temperature are about 25° C. in the experimental operations of the embodiments. Waste batteries are purchased from Guangdong Brunp Recycling Technology Co., Ltd., potassium carbonate, sodium hydroxide, sodium carbonate and sodium chlorate are purchased from Shanghai Macklin Biochemical Co., Ltd., and sulfuric acid and hydrochloric acid are purchased from Shanghai Aladdin Bio-Chem Technology Co., Ltd.

Embodiment 1

A method for preparing refractory materials with waste battery residues includes the following steps of:
(1) dismantling a waste battery with a dismantling machine, then pyrolyzing, crushing and mechanically sorting to obtain positive and negative powders, performing acid leaching on the positive and negative powders with a sulfuric acid, and filtering to obtain a graphite slag, then adding iron to a filtrate to remove copper, and then adding sodium hydroxide, sodium carbonate and sodium chlorate for a precipitation reaction to obtain an iron-aluminum slag;
(2) wrapping the graphite slag obtained in step (1) with wet clay into an inner core material, then mixing a small amount of wet clay with the iron-aluminum slag and then wrapping the inner core material to form a globularity, and aging at 25° C. for 12 hours to obtain a blank, where a mass ratio of the sum of the iron-aluminum slag to the graphite slag and the wet clay used in the inner and outer layers was 5:4:1, and the wet clay was obtained by mixing clay and a potassium carbonate solution; a mass ratio of the clay to the potassium carbonate solution was 79:21, and the potassium carbonate solution was prepared by potassium carbonate and water, where a mass ratio of the potassium carbonate to the water was 1:20;
(3) calcining the blank prepared in step (3) in a muffle furnace, pre-sintering at 300° C. for 1 hour, then heating to 900° C. for 1 hour at a heating rate of 5° C./min, and cooling with the furnace to obtain a sintered product; and
(4) washing the sintered product with 1M hydrochloric acid solution first and then with distilled water, and drying at 80° C. for 6 hours to obtain the refractory materials.

Refractory materials prepared by the preparation method above.

An application of the refractory materials above in packaging, transportation and storage of a waste battery.

Embodiment 2

A method for preparing refractory materials with waste battery residues includes the following steps of:

(1) dismantling a waste battery with a dismantling machine, then pyrolyzing, crushing and mechanically sorting to obtain positive and negative powders, performing acid leaching on the positive and negative powders with a sulfuric acid, and filtering to obtain a graphite slag, then adding iron to a filtrate to remove copper, and then adding sodium hydroxide, sodium carbonate and sodium chlorate for a precipitation reaction to obtain an iron-aluminum slag;

(2) wrapping the graphite slag obtained in step (1) with wet clay into an inner core material, then mixing a small amount of wet clay with the iron-aluminum slag and then wrapping the inner core material to form a globularity, and aging at 25° C. for 36 hours to obtain a blank, where a mass ratio of the sum of the iron-aluminum slag to the graphite slag and the wet clay used in the inner and outer layers was 5:4:1, and the wet clay was obtained by mixing clay and a potassium carbonate solution; a mass ratio of the clay to the potassium carbonate solution was 55:45, and the potassium carbonate solution was prepared by potassium carbonate and water, where a mass ratio of the potassium carbonate to the water was 5:40;

(3) calcining the blank prepared in step (3) in a muffle furnace, pre-sintering at 500° C. for 3 hours, then heating to 1,100° C. for 3 hours at a heating rate of 5° C./min, and cooling with the furnace to obtain a sintered product; and (4) washing the sintered product with 1M hydrochloric acid solution first and then with distilled water, and drying at 80° C. for 6 hours to obtain the refractory materials.

Refractory materials prepared by the preparation method above.

An application of the refractory materials above in packaging, transportation and storage of a waste battery.

Embodiment 3

A method for preparing refractory materials with waste battery residues includes the following steps of:

(1) dismantling a waste battery with a dismantling machine, then pyrolyzing, crushing and mechanically sorting to obtain positive and negative powders, performing acid leaching on the positive and negative powders with a sulfuric acid, and filtering to obtain a graphite slag, then adding iron to a filtrate to remove copper, and then adding sodium hydroxide, sodium carbonate and sodium chlorate for a precipitation reaction to obtain an iron-aluminum slag;

(2) wrapping the graphite slag obtained in step (1) with wet clay into an inner core material, then mixing a small amount of wet clay with the iron-aluminum slag and then wrapping the inner core material to form a globularity, and aging at 25° C. for 24 hours to obtain a blank, where a mass ratio of the sum of the iron-aluminum slag to the graphite slag and the wet clay used in the inner and outer layers was 6:3:1, and the wet clay was obtained by mixing clay and a potassium carbonate solution; a mass ratio of the clay to the potassium carbonate solution was 67:33, and the potassium carbonate solution was prepared by potassium carbonate and water, where a mass ratio of the potassium carbonate to the water was 3:30;

(3) calcining the blank prepared in step (3) in a muffle furnace, pre-sintering at 400° C. for 1 hour, then heating to 1,100° C. for 1 hour at a heating rate of 5° C./min, and cooling with the furnace to obtain a sintered product; and (4) washing the sintered product with 1M hydrochloric acid solution first and then with distilled water, and drying at 80° C. for 6 hours to obtain the refractory materials.

Refractory materials prepared by the preparation method above.

An application of the refractory materials above in packaging, transportation and storage of a waste battery.

Embodiment 4

A method for preparing refractory materials with waste battery residues includes the following steps of:

(1) dismantling a waste battery with a dismantling machine, then pyrolyzing, crushing and mechanically sorting to obtain positive and negative powders, performing acid leaching on the positive and negative powders with a sulfuric acid, and filtering to obtain a graphite slag, then adding iron to a filtrate to remove copper, and then adding sodium hydroxide, sodium carbonate and sodium chlorate for a precipitation reaction to obtain an iron-aluminum slag;

(2) wrapping the graphite slag obtained in step (1) with wet clay into an inner core material, then mixing a small amount of wet clay with the iron-aluminum slag and then wrapping the inner core material to form a globularity, and aging at 25° C. for 12 hours to obtain a blank, where a mass ratio of the sum of the iron-aluminum slag to the graphite slag and the wet clay used in the inner and outer layers was 6:3:1, and the wet clay was obtained by mixing clay and a potassium carbonate solution; a mass ratio of the clay to the potassium carbonate solution was 55:45, and the potassium carbonate solution was prepared by potassium carbonate and water, where a mass ratio of the potassium carbonate to the water was 5:40;

(3) calcining the blank prepared in step (3) in a muffle furnace, pre-sintering at 500° C. for 3 hours, then heating to 1,100° C. for 3 hours at a heating rate of 5° C./min, and cooling with the furnace to obtain a sintered product; and (4) washing the sintered product with 1M hydrochloric acid solution first and then with distilled water, and drying at 80° C. for 6 hours to obtain the refractory materials.

Refractory materials prepared by the preparation method above.

An application of the refractory materials above in packaging, transportation and storage of a waste battery.

Embodiment 5

A method for preparing refractory materials with waste battery residues includes the following steps of:

(1) dismantling a waste battery with a dismantling machine, then pyrolyzing, crushing and mechanically sorting to obtain positive and negative powders, performing acid leaching on the positive and negative powders with a sulfuric acid, and filtering to obtain a graphite slag, then adding iron to a filtrate to remove copper, and then adding sodium hydroxide, sodium carbonate and sodium chlorate for a precipitation reaction to obtain an iron-aluminum slag;

(2) wrapping the graphite slag obtained in step (1) with wet clay into an inner core material, then mixing a small amount of wet clay with the iron-aluminum slag and then wrapping the inner core material to form a globularity, and aging at 25° C. for 12 hours to obtain a blank, where a mass ratio of the sum of the iron-aluminum slag to the graphite slag and the wet clay used in the inner and outer layers was 7:2:1, and the wet clay was obtained by mixing clay and a potassium carbonate solution; a mass ratio of the clay to the potassium carbonate solution was 79:21, and the potassium carbonate solution was prepared by potassium carbonate and water, where a mass ratio of the potassium carbonate to the water was 1:20;

(3) calcining the blank prepared in step (3) in a muffle furnace, pre-sintering at 300° C. for 1 hour, then heating to 900° C. for 1 hour at a heating rate of 5° C./min, and cooling with the furnace to obtain a sintered product; and (4) washing the sintered product with 1M hydrochloric acid solution first and then with distilled water, and drying at 80° C. for 6 hours to obtain the refractory materials.

Refractory materials prepared by the preparation method above.

An application of the refractory materials above in packaging, transportation and storage of a waste battery.

Embodiment 6

A method for preparing refractory materials with waste battery residues includes the following steps of:

(1) dismantling a waste battery with a dismantling machine, then pyrolyzing, crushing and mechanically sorting to obtain positive and negative powders, performing acid leaching on the positive and negative powders with a sulfuric acid, and filtering to obtain a graphite slag, then adding iron to a filtrate to remove copper, and then adding sodium hydroxide, sodium carbonate and sodium chlorate for a precipitation reaction to obtain an iron-aluminum slag;

(2) wrapping the graphite slag obtained in step (1) with wet clay into an inner core material, then mixing a small amount of wet clay with the iron-aluminum slag and then wrapping the inner core material to form a globularity, and aging at 25° C. for 12 hours to obtain a blank, where a mass ratio of the sum of the iron-aluminum slag to the graphite slag and the wet clay used in the inner and outer layers was 7:2:1, and the wet clay was obtained by mixing clay and a potassium carbonate solution; a mass ratio of the clay to the potassium carbonate solution was 55:45, and the potassium carbonate solution was prepared by potassium carbonate and water, where a mass ratio of the potassium carbonate to the water was 5:40;

(3) calcining the blank prepared in step (3) in a muffle furnace, pre-sintering at 500° C. for 3 hours, then heating to 1,100° C. for 3 hours at a heating rate of 5° C./min, and cooling with the furnace to obtain a sintered product; and (4) washing the sintered product with 1M hydrochloric acid solution first and then with distilled water, and drying at 80° C. for 6 hours to obtain the refractory materials.

Refractory materials prepared by the preparation method above.

An application of the refractory materials above in packaging, transportation and storage of a waste battery.

Comparative Example 1

A method for preparing refractory materials with waste battery residues includes the following steps of:

(1) dismantling a waste battery with a dismantling machine, then pyrolyzing, crushing and mechanically sorting to obtain positive and negative powders, performing acid leaching on the positive and negative powders with a sulfuric acid, and filtering to obtain a graphite slag, then adding iron to a filtrate to remove copper, and then adding sodium hydroxide, sodium carbonate and sodium chlorate for a precipitation reaction to obtain an iron-aluminum slag;

(2) wrapping the graphite slag obtained in step (1) with wet clay into an inner core material, then mixing a small amount of wet clay with the iron-aluminum slag and then wrapping the inner core material to form a globularity, and aging at 25° C. for 12 hours to obtain a blank, where a mass ratio of the sum of the iron-aluminum slag to the graphite slag and the wet clay used in the inner and outer layers was 5:4:1, and the wet clay was obtained by mixing clay and distilled water; a mass ratio of the clay to the distilled water was 79:21;

(3) calcining the blank prepared in step (3) in a muffle furnace, pre-sintering at 300° C. for 1 hour, then heating to 900° C. for 1 hour at a heating rate of 5° C./min, and cooling with the furnace to obtain a sintered product; and (4) washing the sintered product with 1M hydrochloric acid solution first and then with distilled water, and drying at 80° C. for 6 hours to obtain the refractory materials.

Refractory materials prepared by the preparation method above.

EXPERIMENTAL EXAMPLE

Figure 1:
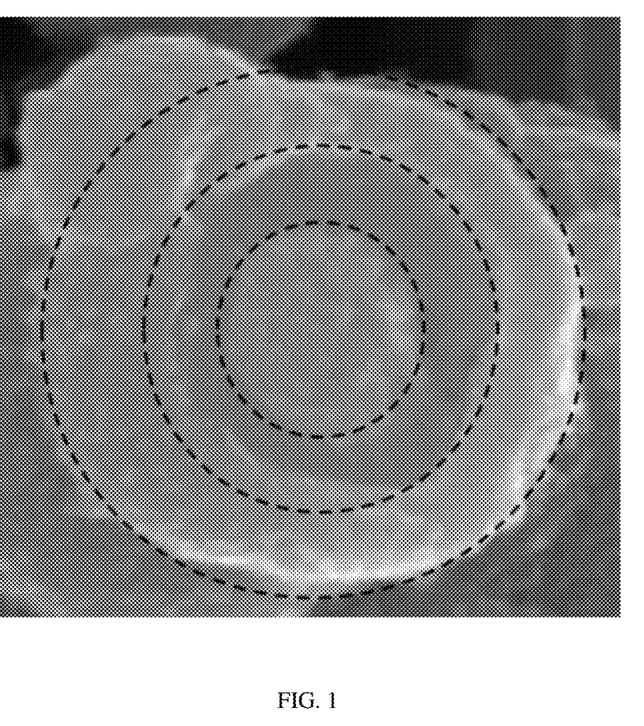
FIG. 1 is an SEM graph of Embodiment 1.

1. Morphologies of the refractories of Embodiment 1 and Comparative Example 1 were observed by a scanning electron microscope. The results were shown in FIG. 1 and FIG. 6. Comparing FIG. 1 with FIG. 6, it could be seen that the interior of the refractory materials of Embodiment 1 had multi-layer structure and were more loose and porous in comparison to Comparative Example 1. The porous structure of the refractory materials of Embodiment 1 were tested by an automatic specific surface area analyzer and inductively coupled plasma emission spectrometer, and the results were shown in FIG. 2. The refractory materials of Embodiment 1 were subjected to a heat resistance test by a synchronous integrated thermal analyzer, and the results were shown in FIG. 3. Appropriate amounts of refractories of Embodiments 1, 3 and 5 and Comparative Example 1 were taken respectively. The refractories were soaked in an organic electrolyte of a lithium ion battery for 5 minutes, and then the electrolyte absorption was calculated by the following formula, $$P = \frac{m_1 - m_0}{m_0} \times 100\%,$$

where $P$ (%) was an absorption rate of the refractory materials; $m_0$ and $m_{1(g)}$ were masses of the refractories before and after adsorption respectively. The results were shown in FIG. 4. For recycling the refractory materials of Embodiment 3 after absorbing the electrolyte, the refractory materials of Embodiment 3 were first sintered at 500° C. for 2 hours, then washed with 1M hydrochloric acid for 3 times, then washed with water until neutrality, then put in the lithium ion electrolyte again and soaked for 5 minutes, and then the absorption rate was calculated. The experiment was repeated for 6 times. The results were shown in FIG. 5.

2. An inductively coupled plasma emission spectrometer was used to test metal contents in the refractory materials prepared in Embodiment 1 and the iron-aluminum slag obtained in step (1) of Embodiment 1 respectively. The results were shown in Table 1.

TABLE 1

Metallic element contents of refractory

| Sample | Ni | Co | Al | Fe | Ca | Cu |
|---|---|---|---|---|---|---|
| | | | mg/L | | | |
| Iron-aluminum slag | 0.01 | 0.01 | 1.44 | 0.08 | 2.58 | 0.02 |
| Embodiment 1 | 0.005 | 0.005 | 0.86 | 0.05 | 2.58 | 0.006 |

Figure 2:
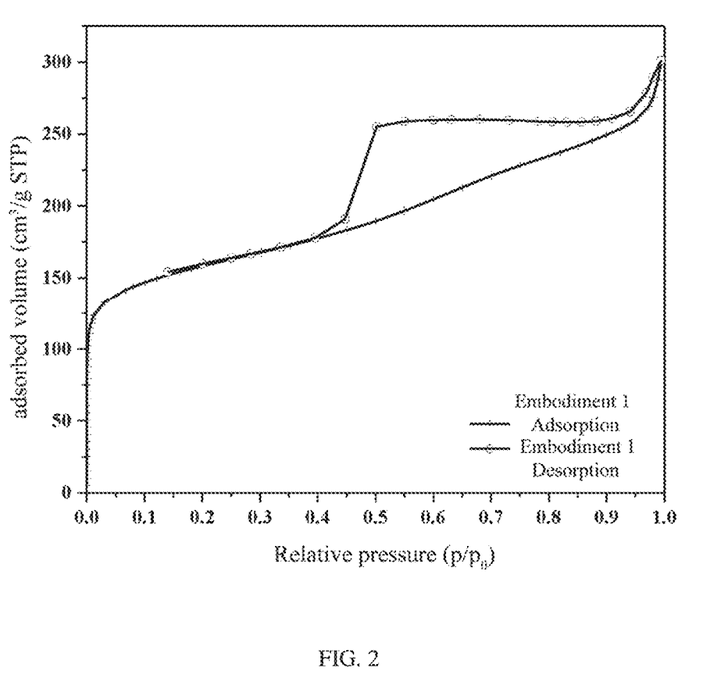
FIG. 2 is an isothermal adsorption-desorption curve of Embodiment 1.

It can be seen from FIG. 2 that the isothermal adsorption-desorption curve of the refractory materials of the present disclosure shows obvious hysteresis loop, which indicates that the refractory materials of Embodiment 1 are mainly mesoporous material, and the adsorbed volume of Embodiment 1 is 125 cm$^3$/g STP when P/P$_0$ is less than 0.01, that is, the refractory materials have more micropores, which indicates that the refractory materials have excellent adsorption capacity, i.e., good moisture absorption capacity.

Figure 3:
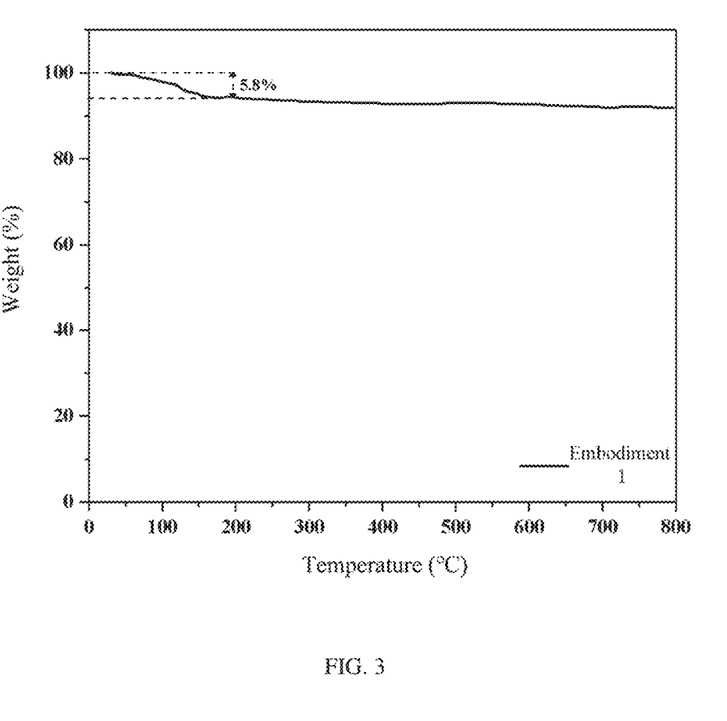
FIG. 3 is a thermogravimetric curve of Embodiment 1.

It can be seen from FIG. 3 that the refractory materials of the present disclosure has strong high-temperature resistance, and a TG curve shows that when the temperature is less than 200° C., a weight of the refractory materials decreases by 5.8%, and a water volatilization reaction occurs at this stage. The weight of the refractory materials does not change between 200° C. and 800° C., which indicates that the refractory materials have excellent high-temperature resistance.

Figure 4:
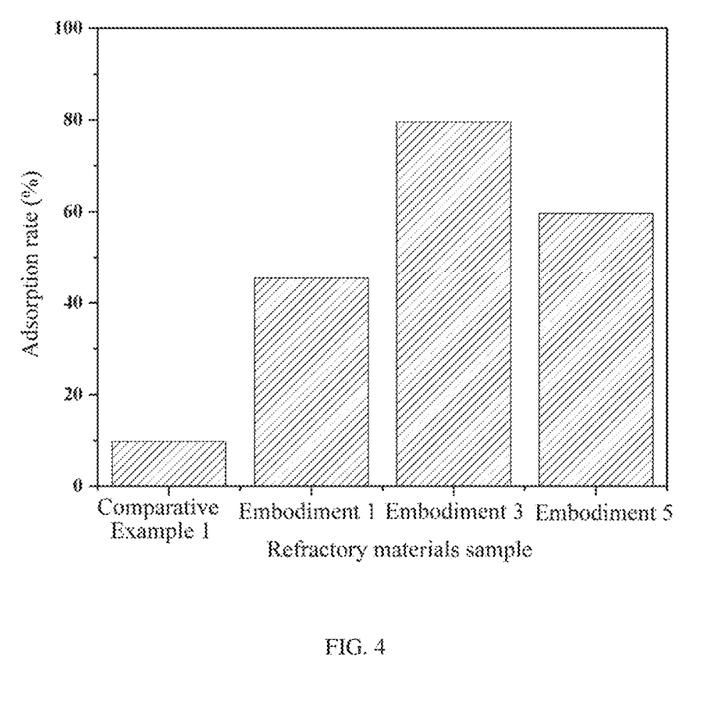
FIG. 4 is a diagram showing absorption capacities of Embodiments 1, 3, 5 and Comparative Example 1 on an organic electrolyte of a lithium ion battery.

It can be seen from FIG. 4 that the refractory materials of the present disclosure have excellent adsorption capacity for the organic electrolyte of the lithium ion battery, and meanwhile, it can be seen by comparing Embodiment 1 with Comparative Example 1 that when potassium carbonate is used in the preparation process of the refractory materials of the present disclosure, the final refractory has better adsorption capacity for the organic electrolyte of the lithium ion battery.

Figure 5:
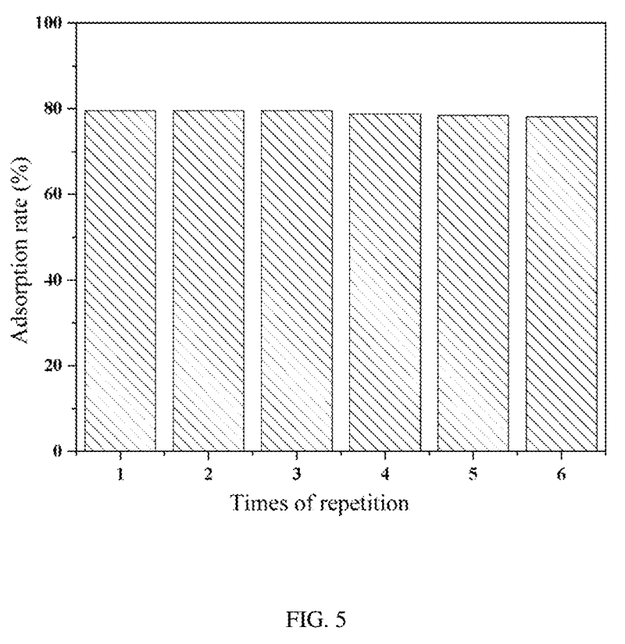
FIG. 5 is a diagram showing a repeated adsorption performance of Embodiment 1.
Figure 6:
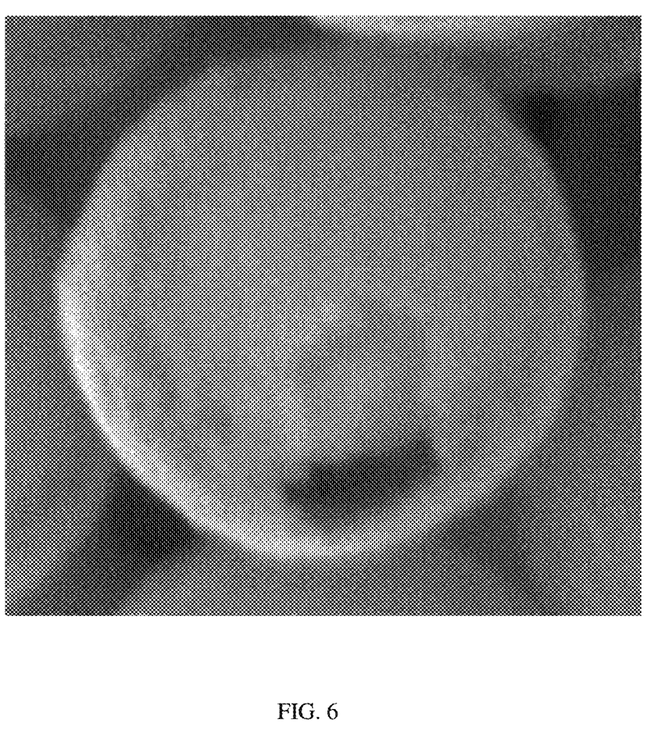
FIG. 6 is an SEM graph of Comparative Example 1.

It can be seen from FIG. 5 that when the refractory materials of the present disclosure are used repeatedly, the absorption rate thereof to the organic electrolyte of the lithium ion battery remains unchanged, so the refractory materials of the present disclosure can be reused and the cost can be effectively controlled.

It can be seen from Table 1 that the refractory materials of Embodiment 1 of the present disclosure have a lower heavy metal content in comparison to the iron-aluminum slag, which indicates that the transition metal content of the refractory materials can be effectively reduced through simple process treatment, which meets the requirements of national standards, is nontoxic, harmless and pollution-free, and achieves the effect of being harmless to the environment.

The above embodiments are preferred embodiments of the present disclosure, but the embodiments of the present disclosure are not limited to the above embodiments, and any other changes, modifications, substitutions, combinations, and simplifications made without departing from the spirit and scope of the present disclosure should be equivalent replacement means, and are included in the protection scope of the present disclosure.

The invention claimed is:

1. A method for preparing a refractory material with waste battery residues, comprising the steps of:
    (1) dismantling a waste battery and sorting to obtain positive and negative electrode powders, performing acid leaching on the positive and negative powders, filtering the positive and negative powders after performing acid leaching to obtain a filtrate and a graphite slag, then removing copper from the filtrate, and adding an alkali into a resulting filtrate after removing copper for a precipitation reaction to obtain an iron-aluminum slag;
    (2) wrapping the graphite slag obtained in step (1) with wet clay to form an inner core material, mixing the wet clay with the iron-aluminum slag, and then wrapping the inner core material with a resulting mixture of the wet clay and the iron-aluminum slag, and aging to obtain a blank;
    (3) pre-sintering, calcining and cooling the blank prepared in step (2) to obtain a sintered product; and
    (4) washing and drying the sintered product to obtain the refractory material;
    wherein the wet clay in step (2) is prepared by mixing clay with a potassium carbonate solution; and the aging is performed at a temperature of 25° ° C. to 35° C., and lasts for 12 hours to 36 hours;
    wherein in step (3), the pre-sintering is performed at a temperature of 300° ° C. to 500° C., and lasts for 1 hour to 3 hours; and the calcining is performed at a temperature of 900° C. to 1,100° C. and lasts for 1 hour to 3 hours, and a heating rate from pre-sintering to calcining is 3° C./min to 10° C./min.

2. The method for preparing the refractory material with waste battery residues according to claim 1, wherein a mass ratio of the clay to the potassium carbonate solution in the wet clay is 55:45 to 79:21.

3. The method for preparing the refractory material with waste battery residues according to claim 2, wherein the potassium carbonate solution is prepared by potassium carbonate and water, wherein a mass ratio of the potassium carbonate to the water is 1:40 to 5:20.

4. The method for preparing the refractory material with waste battery residues according to claim 1, wherein in step (2), a mass ratio of the iron-aluminum slag to the graphite slag and the wet clay is 5:4:1 to 7:2:1.

5. A refractory material, wherein the refractory material is prepared by the method according to claim 1.

6. A refractory material, wherein the refractory material is prepared by the method according to claim 2.

7. A refractory material, wherein the refractory material is prepared by the method according to claim 3.

8. A refractory material, wherein the refractory material is prepared by the method according to claim 4.

\* \* \* \* \*